United States Patent
Chen

(10) Patent No.: US 8,365,655 B2
(45) Date of Patent: Feb. 5, 2013

(54) BARBECUE STOVE

(75) Inventor: Jan-Nan Chen, Taichung (TW)

(73) Assignee: Arlo Lin, Taichung (TW)

(*) Notice: Subject to any disclaimer, the term of this patent is extended or adjusted under 35 U.S.C. 154(b) by 642 days.

(21) Appl. No.: 12/604,587

(22) Filed: Oct. 23, 2009

(65) Prior Publication Data
US 2010/0037783 A1 Feb. 18, 2010

Related U.S. Application Data

(63) Continuation-in-part of application No. 11/733,881, filed on Apr. 11, 2007.

(30) Foreign Application Priority Data

Mar. 3, 2007 (TW) .................................. 96107411

(51) Int. Cl.
*A47J 37/08* (2006.01)
*A23L 1/00* (2006.01)
(52) U.S. Cl. ................. 99/372; 99/375; 99/377; 99/422; 126/275 R; 126/25 R; 219/450.1; 219/524
(58) Field of Classification Search ..................... 99/372, 99/373, 374, 375, 376, 377, 378, 379, 422, 99/425; 126/25 R, 19 R, 39 BA, 275 R; 219/450.1, 219/465.1, 524, 525; 220/4.24, 4.25
See application file for complete search history.

(56) References Cited

U.S. PATENT DOCUMENTS

| | | | |
|---|---|---|---|
| 4,646,711 A | 3/1987 | Oliphant | 126/9 R |
| 5,195,423 A | 3/1993 | Beller | 99/340 |
| 5,249,842 A | 10/1993 | Doering et al. | 298/6 |
| 5,369,549 A * | 11/1994 | Kopp et al. | 312/263 |
| 6,595,116 B1 | 7/2003 | Lin | 99/349 |
| 7,301,128 B2 | 11/2007 | Li et al. | |
| 7,373,875 B2 | 5/2008 | Bruno et al. | 99/400 |
| 2004/0069294 A1 | 4/2004 | Bossler | 126/41 R |
| 2004/0182252 A1 | 9/2004 | Brady et al. | 99/372 |
| 2004/0194774 A1 | 10/2004 | Nugent et al. | 126/41 R |
| 2004/0216730 A1 | 11/2004 | Sawhney et al. | 126/1 |
| 2005/0139086 A1 | 6/2005 | McHutchison | 99/389 |

OTHER PUBLICATIONS

Chinese Utility Model Publication No. CN 2387839 Y, Jul. 19, 2000, 6 pages.
Chinese Utility Model Publication No. CN 2774358 Y, Apr. 26, 2006, 22 pages.
German Utility Model Publication No. DE 202005005038 U1, Jul. 14, 2005, 11 pages.
French Patent Publication No. FR 2177590, Nov. 9, 1973, 6 pages.
Taiwanese Utility Model Publication No. TW M294907, Aug. 1, 2006, 4 pages.
Taiwanese Patent Publication No. TW 1282267, Jun. 11, 2007, 10 pages.
PCT Patent Publication No. WO 94/22354 A1, Oct. 13, 1994, 35 pages.
PCT Patent Publication No. WO 99/00041 A1, Jan. 7, 1999, 18 pages.
PCT Patent Publication No. WO 2004/054416 A1, Jul. 1, 2004, 40 pages.

* cited by examiner

*Primary Examiner* — Reginald L Alexander
(74) *Attorney, Agent, or Firm* — Alan Kamrath; Kamrath IP Lawfirm, P.A.

(57) ABSTRACT

A barbecue stove includes a body, a cover, a storage device, two primary feet and two secondary feet. The cover is pivotally connected to the body. The storage device is attached to the body. The primary feet are attached to the body. The secondary feet are attached to the storage device. The barbecue stove lies on the primary feet in use and stands on the secondary feet in storage.

19 Claims, 18 Drawing Sheets

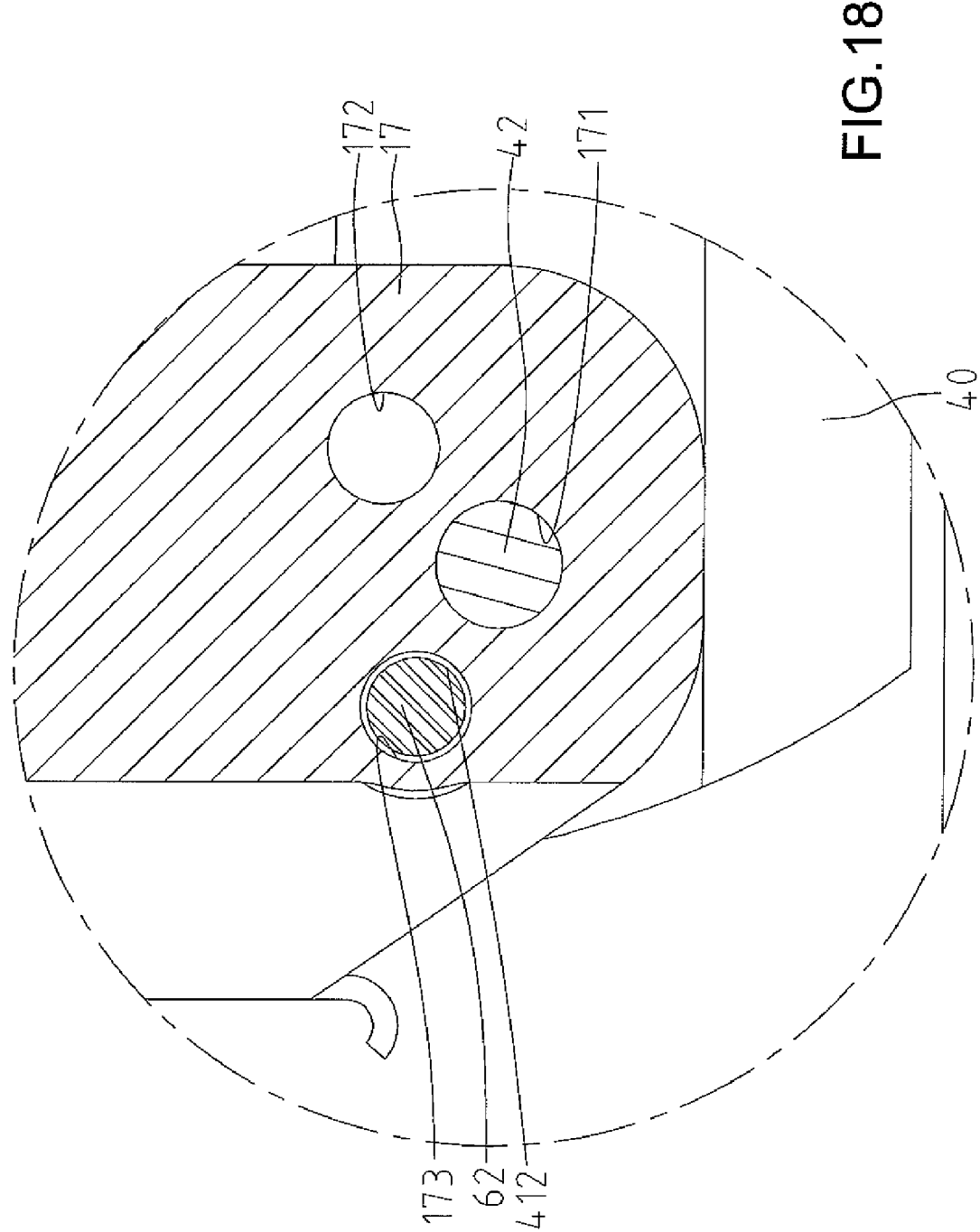

BARBECUE STOVE

CROSS REFERENCE

The present application is a continuation-in-part application of U.S. patent application Ser. No. 11/733,881, filed on Apr. 11, 2007, of which the entire disclosure is incorporated herein.

BACKGROUND OF THE INVENTION

1. Field of the Invention

The present invention relates to a barbecue stove.

2. Description of the Related Art

An electric barbecue stove disclosed in Taiwanese Patent M294907 includes a body 1, a heater 14, a thermal insulation material 15 and a container 2. The body 1 includes an internal layer 10 and an external layer 11. The heater 14 includes at least one heating loop wound around the internal layer 10. The thermal insulation material 15 is provided between the internal layer 10 and external layer 11. Disposed in the internal layer 10 of the body 1 is the container 2 for containing food. There are many problems the electric barbecue stove suffer. One problem is that a sufficient space is absent between the container 2 and the ground for enabling the container 2 to dissipate heat efficiently. Another problem is that the barbecue stove occupies a large storage area. Additionally, two hands are required to transport the barbecue stove. Moreover, the barbecue stove can not be used when electricity is not available.

The present invention is therefore intended to obviate or at least alleviate the problems encountered in the prior art.

SUMMARY OF THE INVENTION

According to the present invention, a barbecue stove includes a body, a cover, a storage device, two primary feet and two secondary feet. The cover is pivotally connected to the body. The storage device is attached to the body. The primary feet are attached to the body. The secondary feet are attached to the storage device. The barbecue lies on the primary feet in use and stands on the secondary feet in storage.

An advantage of the barbecue stove according to the present invention is that it requires a small space in storage.

Another advantage of the barbecue stove according to the present invention is that the storage device can be used to store a fuel can and other things such as an illuminating device.

Other advantages, objectives and features of the present invention will become apparent from the following description referring to the attached drawings.

BRIEF DESCRIPTION OF THE DRAWINGS

FIG. 18 is a partial, enlarged view of FIG. 17.

DETAILED DESCRIPTION OF THE PREFERRED EMBODIMENTS

Figure 1:
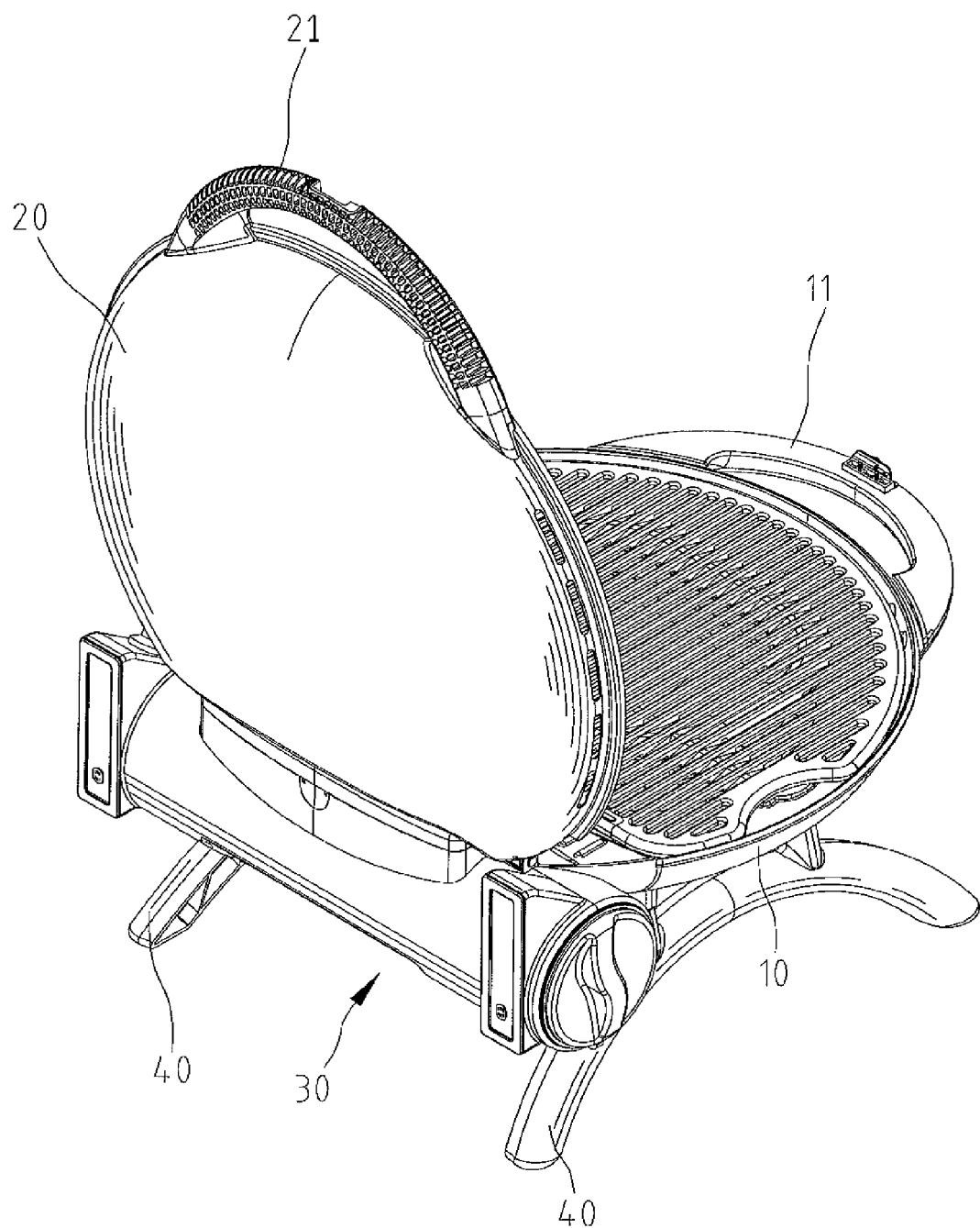
FIG. 1 is a perspective view of a barbecue stove according to the preferred embodiment of the present invention.

Referring to the drawings, a barbecue stove includes a body 10, a heater 12, a grid 14, a cover 20, two primary feet 40, a storage device 30 and two secondary feet 324 according to the preferred embodiment of the present invention. The body 10 defines a compartment, and the heater 12 is disposed in the compartment. Additionally, the compartment includes an open end that enables the grid 14 to be disposed in the body 10, above the heater 12. The cover 20 is pivotally connected to the body 10. The primary feet 40 are pivotally secured to the body 10 and are disposed oppositely. The storage device 30 is provided on the body 10. The secondary feet 324 are formed on the storage device 30.

Figure 4:
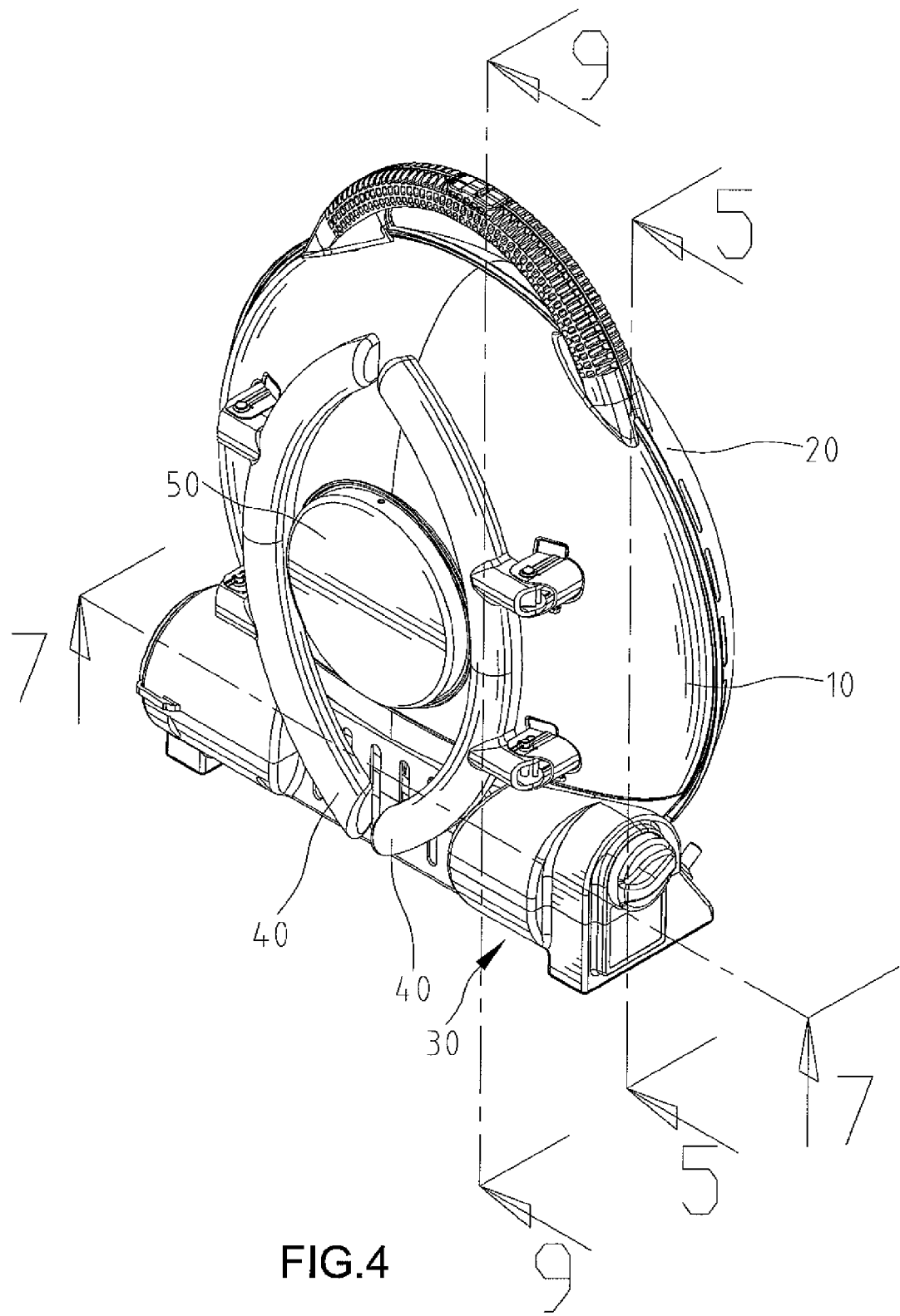
FIG. 4 is a perspective view of the barbecue stove in a collapsed position.

In use, each primary foot 40 is in an extended position to space the body 10 from the ground, or any supporting surface against which the primary feet 40 abut. The primary feet 40 define a use plane. Additionally, the cover 20 is pivoted from the body 10. In storage, the cover 20 is pivoted to the body 10 to close the compartment, and the secondary feet 324 are used to support the barbecue stove on the ground. Additionally, the second feet 324 define a storage plane perpendicular to the use plane. In this regard, the body 10 is disposed upright, and this is advantageous in terms of space occupation, as shown in FIG. 4.

Figure 2:
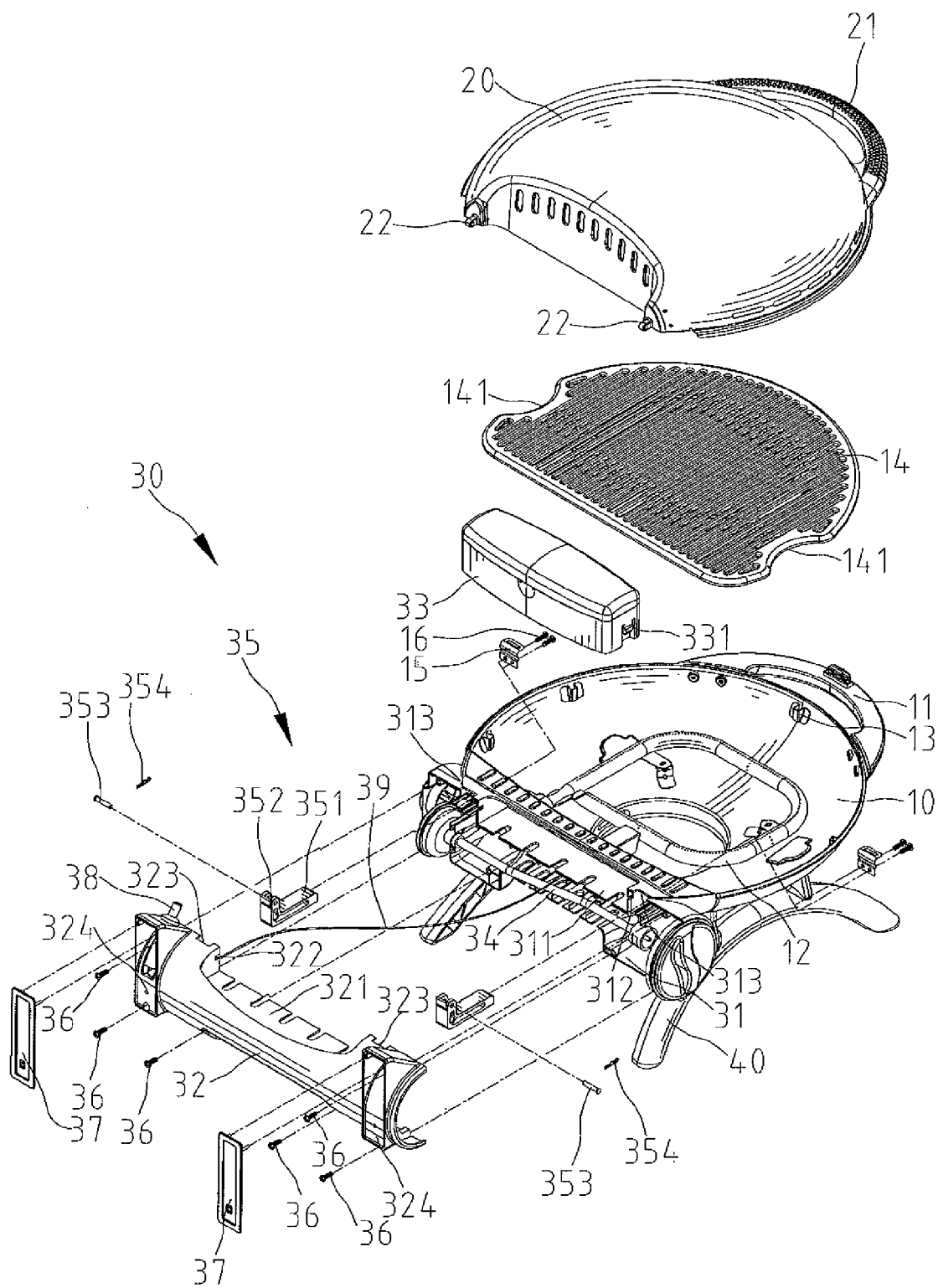
FIG. 2 is an exploded view of the barbecue stove shown in FIG. 1.
Figure 3:
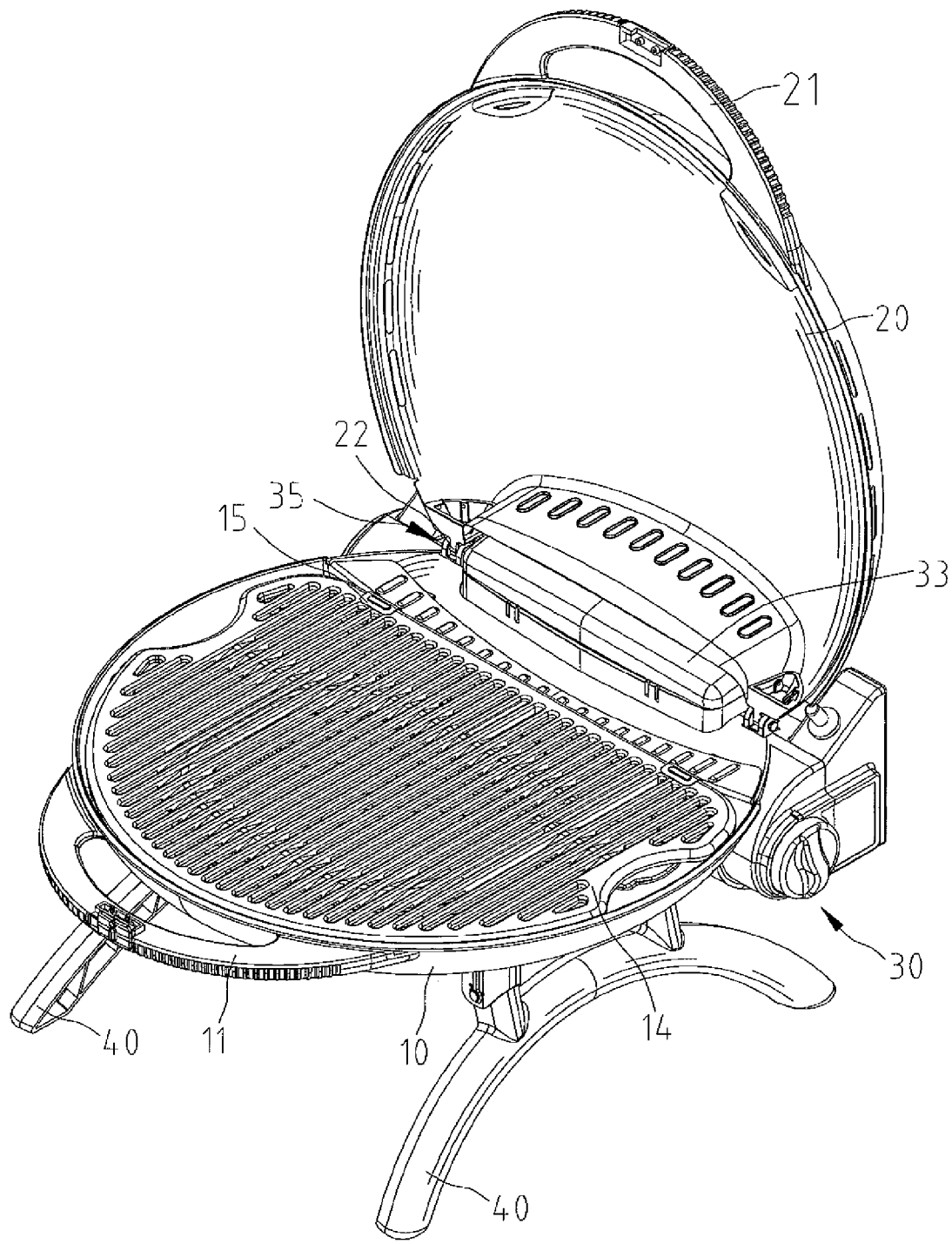
FIG. 3 is a perspective view of the barbecue stove taken from a different angle than that of FIG. 1.

Referring to FIG. 2, the body 10 is shaped like a bowl, as it is substantially round and is open at the top. Additionally, the body 10 includes a handle 11 attached to an external side thereof and brackets 13 attached to an internal side thereof. The handle 11 includes a skid-proof surface.

The grid 14 is supported in the body 10 by a plurality of brackets 13. The grid 14 may, however, be directly supported on the internal side of the body 10 in another embodiment with the brackets 13 omitted. Two recesses 141 are defined in the edge of the grid 14. Thus, when the grid 14 is disposed in the body 10, there are two spaces between the grid 14 and the body 10 to facilitate handling of the grid 14.

The cover 20 includes a handle 21 and two ears 22 provided on an external side thereof. The handle 21 includes a skid-proof surface. The ears 22 serve as pivotal mountings to pivotally connect to the body 10. Additionally, the handle 21 has a shape the same as that of the handle 11 and is disposed correspondingly to the handle 11. Thus, the handles 11 and 21 are engaged mutually to enable the cover 20 to close the compartment in the body 10.

The storage device 30 includes a cylinder attached to the body 10 and a box 33 detachably attached to the cylinder. The cylinder includes a first shell 31 attached to the body 10 and a second shell 32 attached to the first shell 31.

The first shell 31 includes a space 311 and two cutouts 313 defined therein. The space 311 is located between the cutouts 313. Further, a slot 312 is defined in each of two walls between which the space 311 is defined.

The second shell 32 includes a space 321 and two cutouts 323 defined therein. The space 321 is located between the cutouts 323. Further, a slot 322 is defined in each of two walls between which the space 321 is defined.

Figure 9:
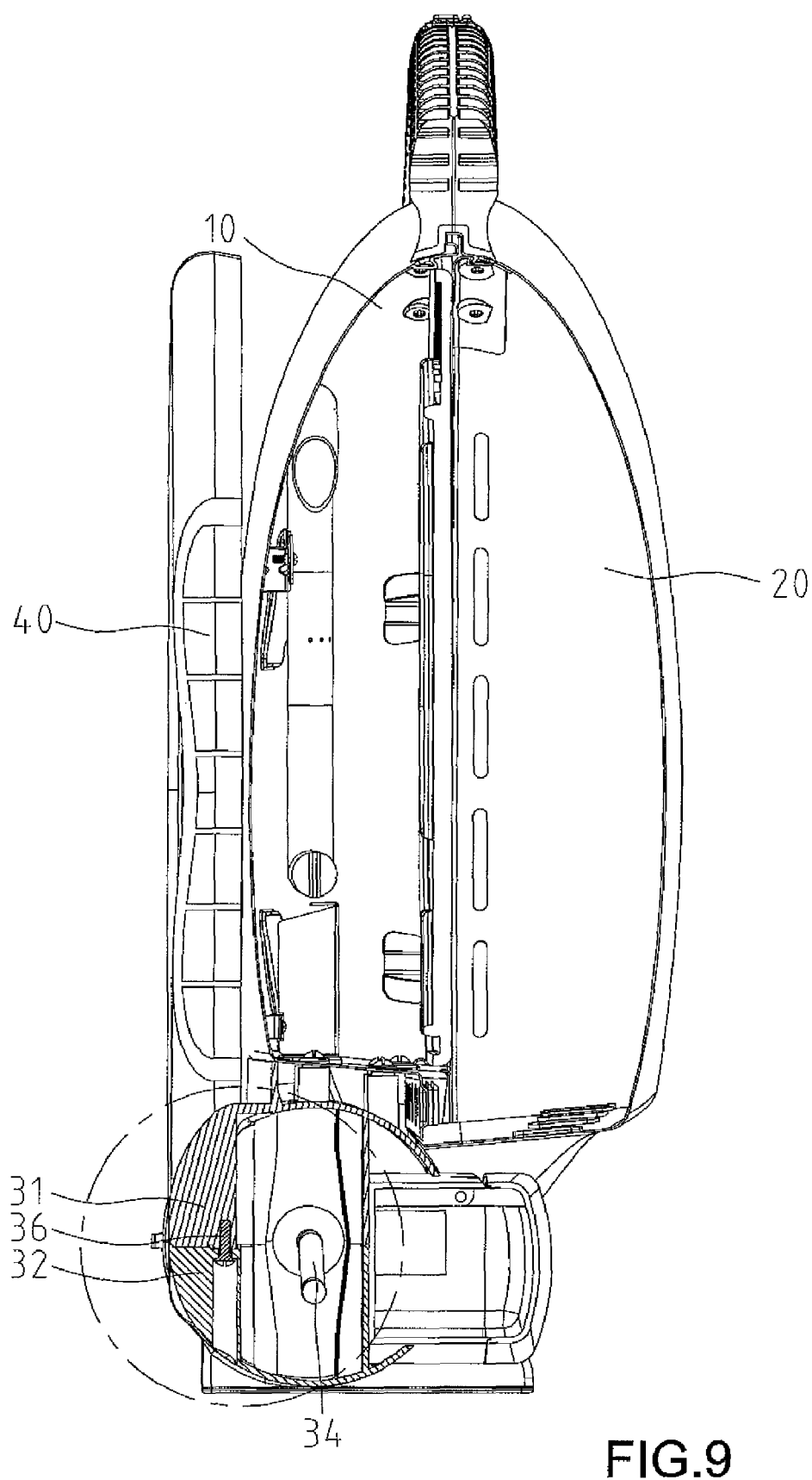
FIG. 9 is a cross-sectional view taken along line 9-9 shown in FIG. 4.
Figure 10:
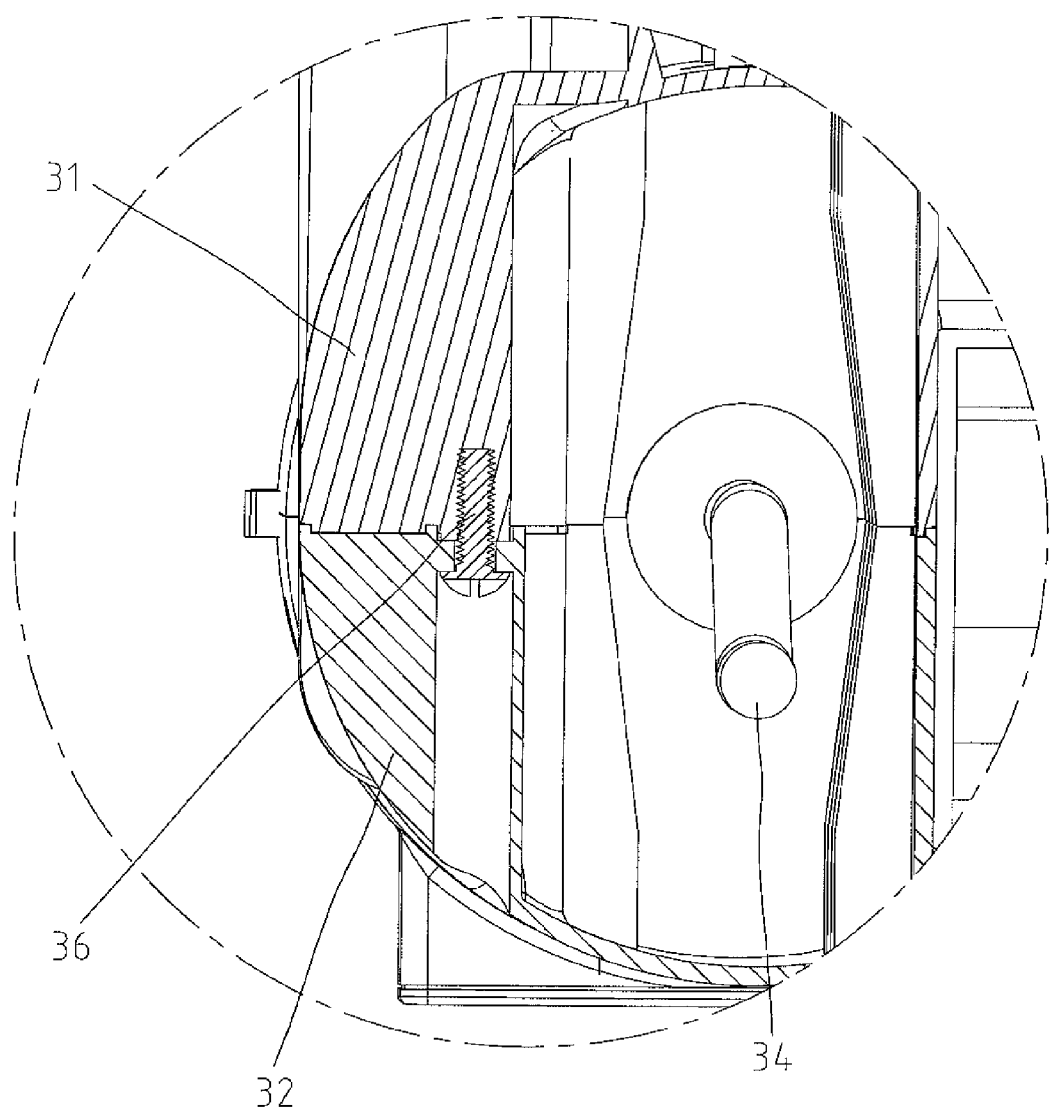
FIG. 10 is a partial, enlarged view of the barbecue stove of FIG. 9.
Figure 11:
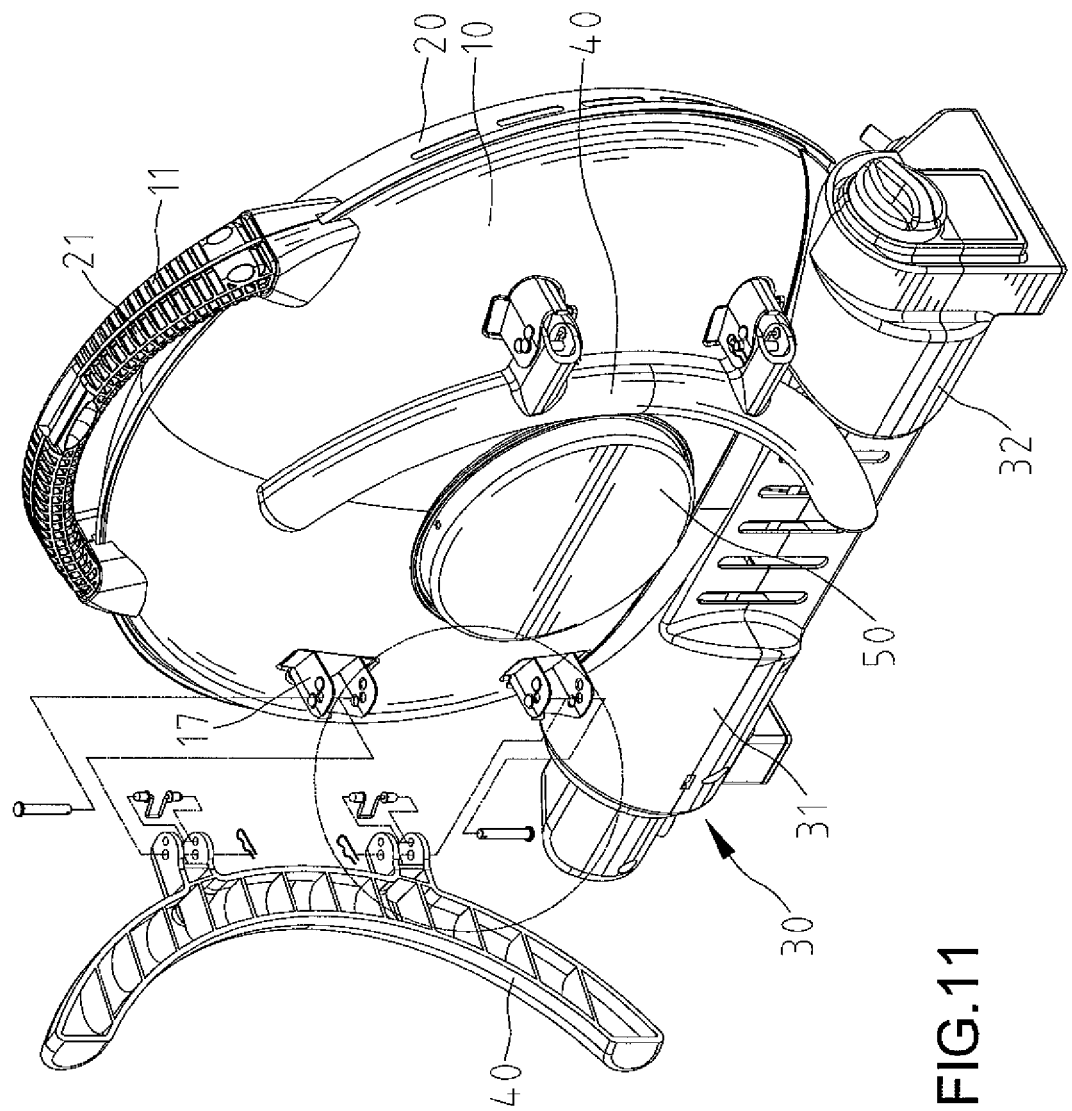
FIG. 11 is a perspective view showing a primary foot embodying the present invention connected to the barbecue stove.
Figure 12:
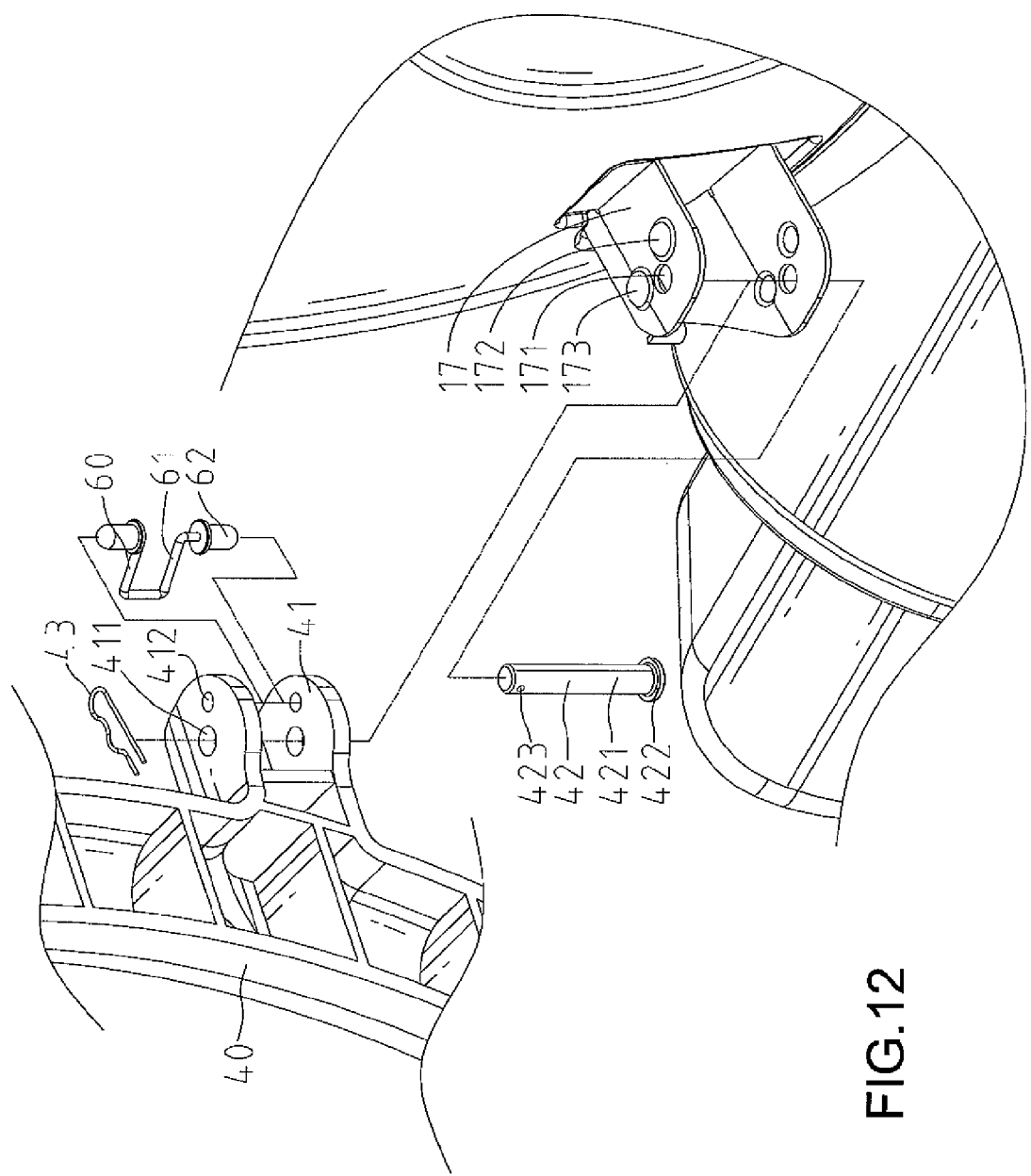
FIG. 12 is a partial, enlarged view of FIG. 11.
Figure 13:
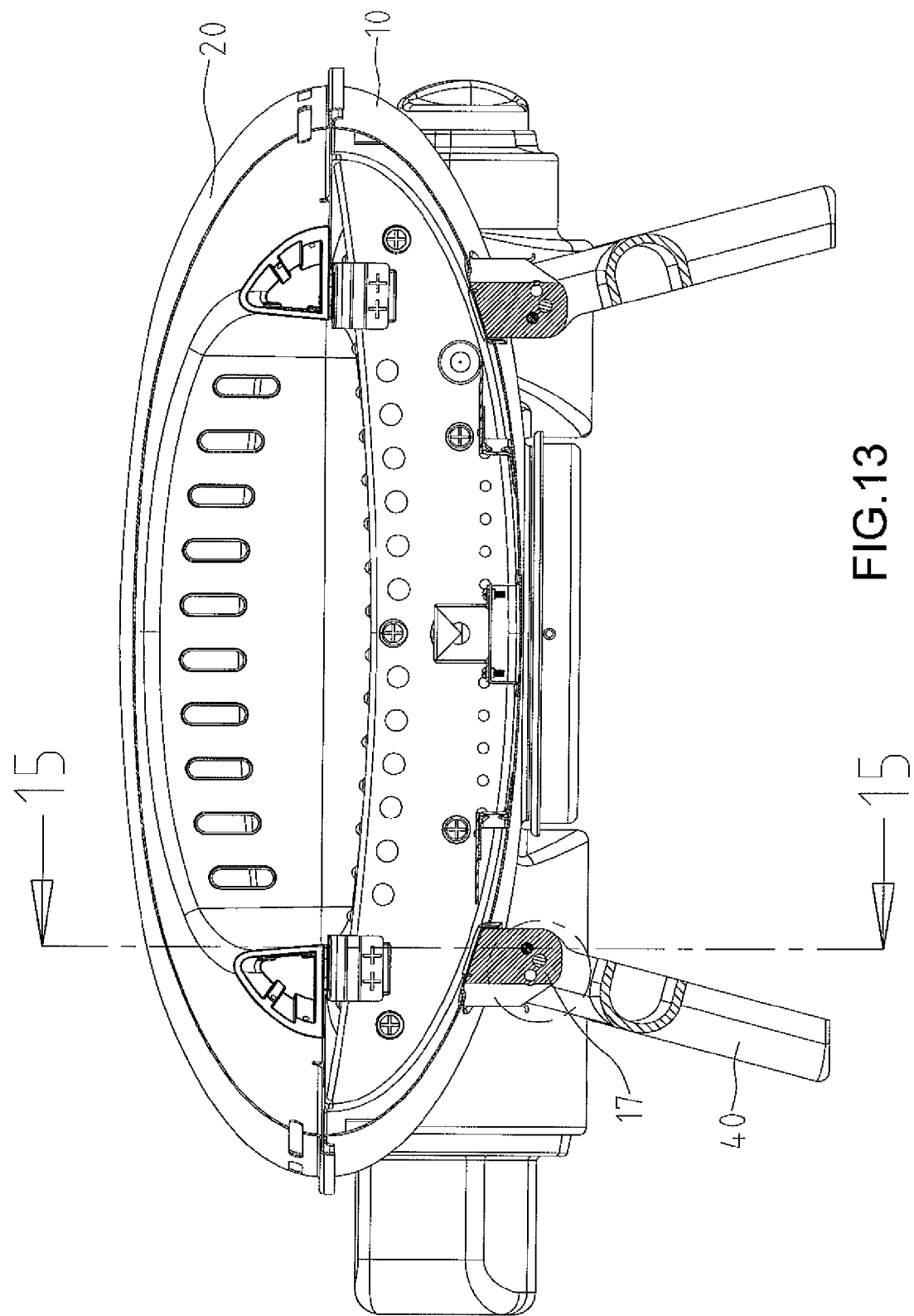
FIG. 13 is a side view showing each primary foot in an extended position.
Figure 14:
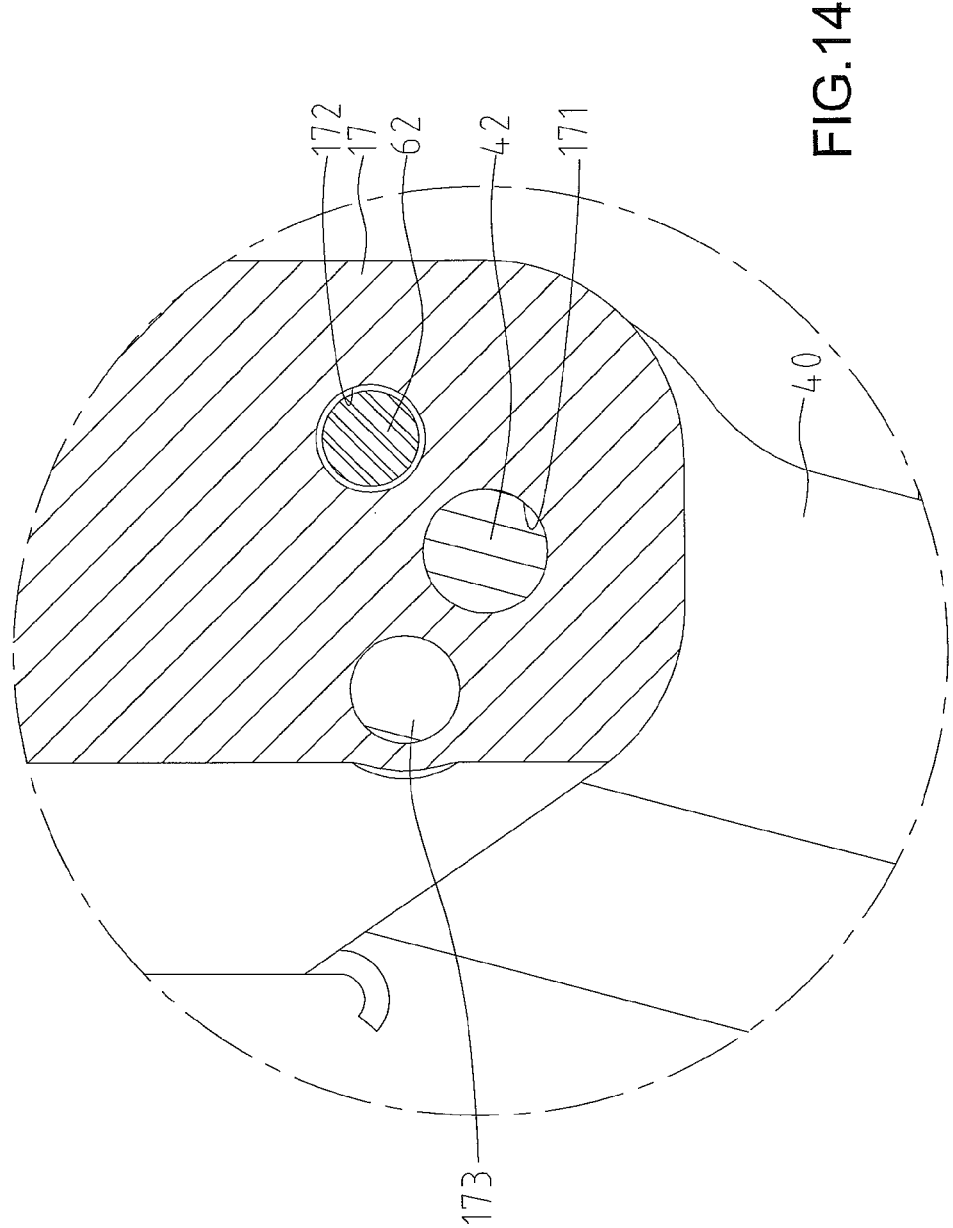
FIG. 14 is a partial, enlarged view of FIG. 13.
Figure 15:
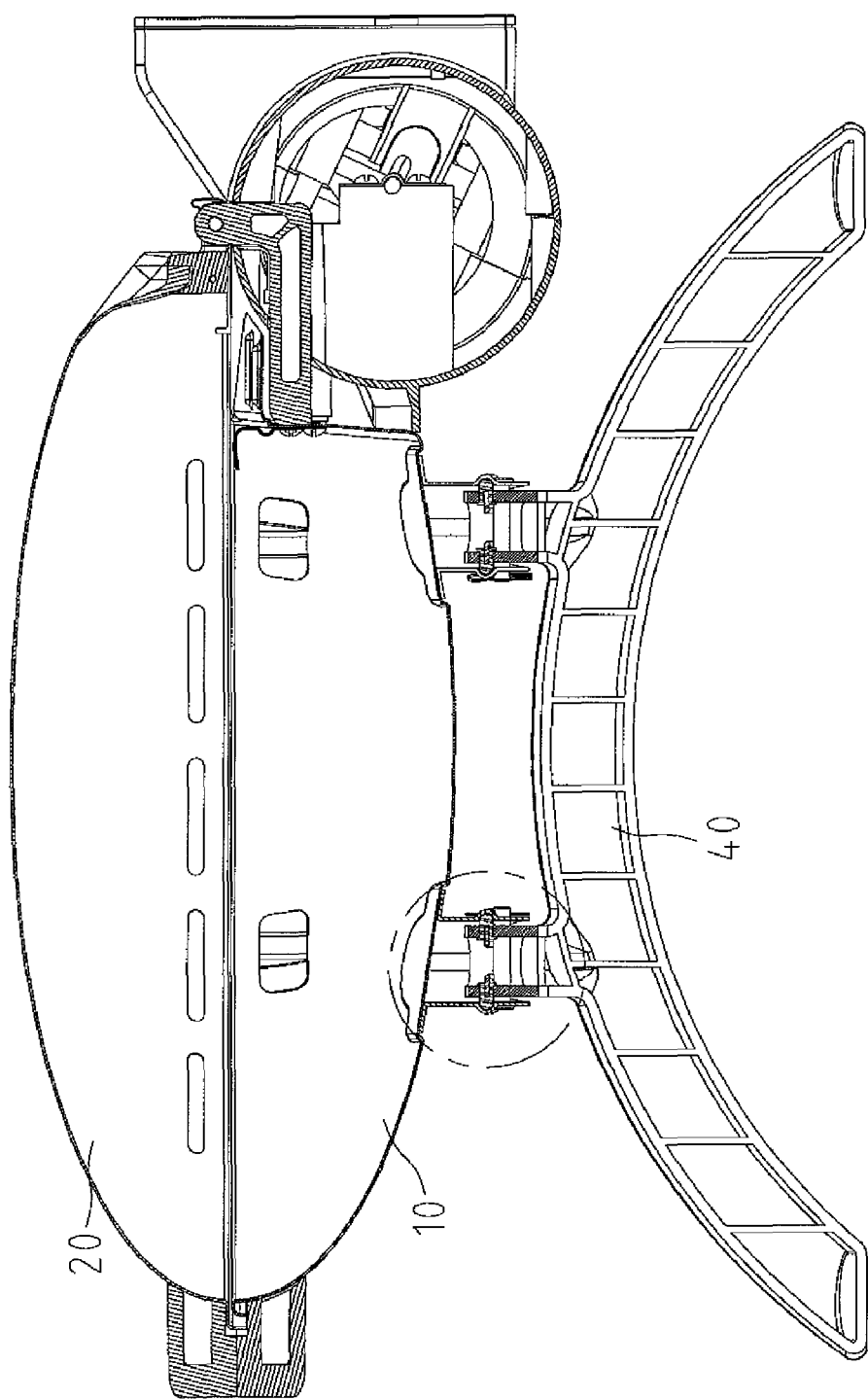
FIG. 15 is a cross section view taken along line 15-15 of FIG. 13 and shows the primary feet in the extended position.
Figure 16:
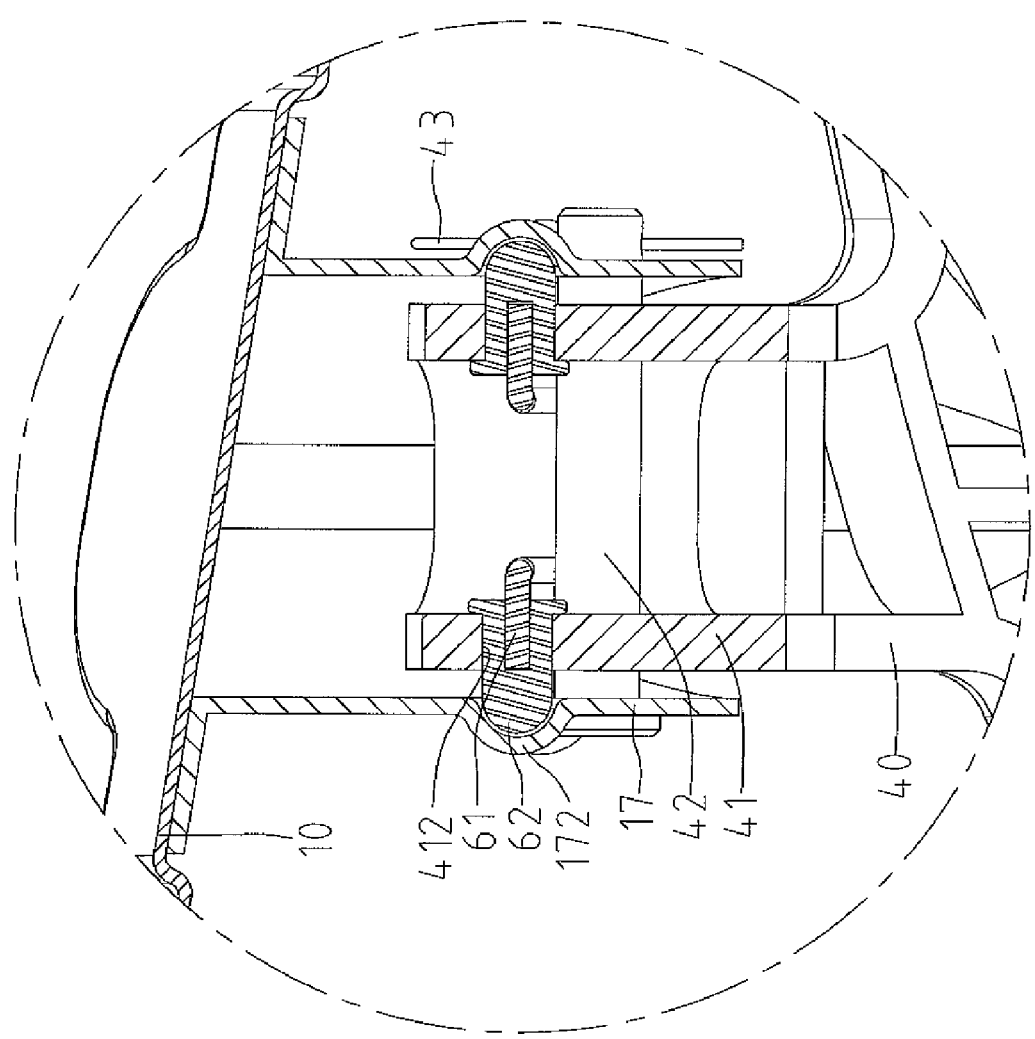
FIG. 16 is a partial, enlarged view of FIG. 15.
Figure 17:
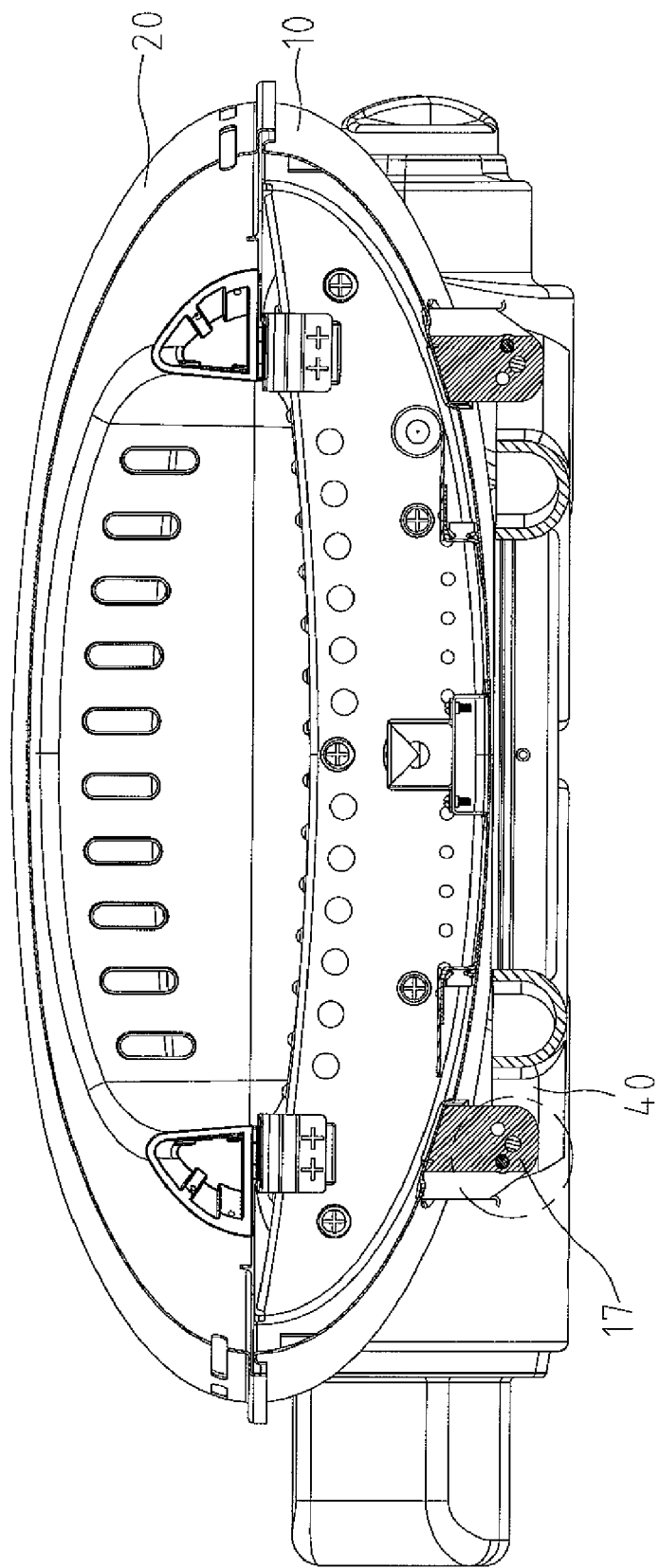
FIG. 17 is a side view showing each primary foot in a collapsed position.

Referring to FIGS. 9 and 10, the second shell 32 is joined to the first shell 31 with threaded bolts 36. The secondary feet 324 are hollow, and the threaded bolts 36 can be inserted in the secondary feet 324 from an open end thereof to secure the first and second shells 31 and 32. Further, a pad 37 is attached to each of the secondary feet 324, thus closing the open end of the secondary feet 324 and concealing the threaded bolts 36 therein. Moreover, the pads 37 help the secondary feet 324 stand firmly on the ground.

Figure 5:
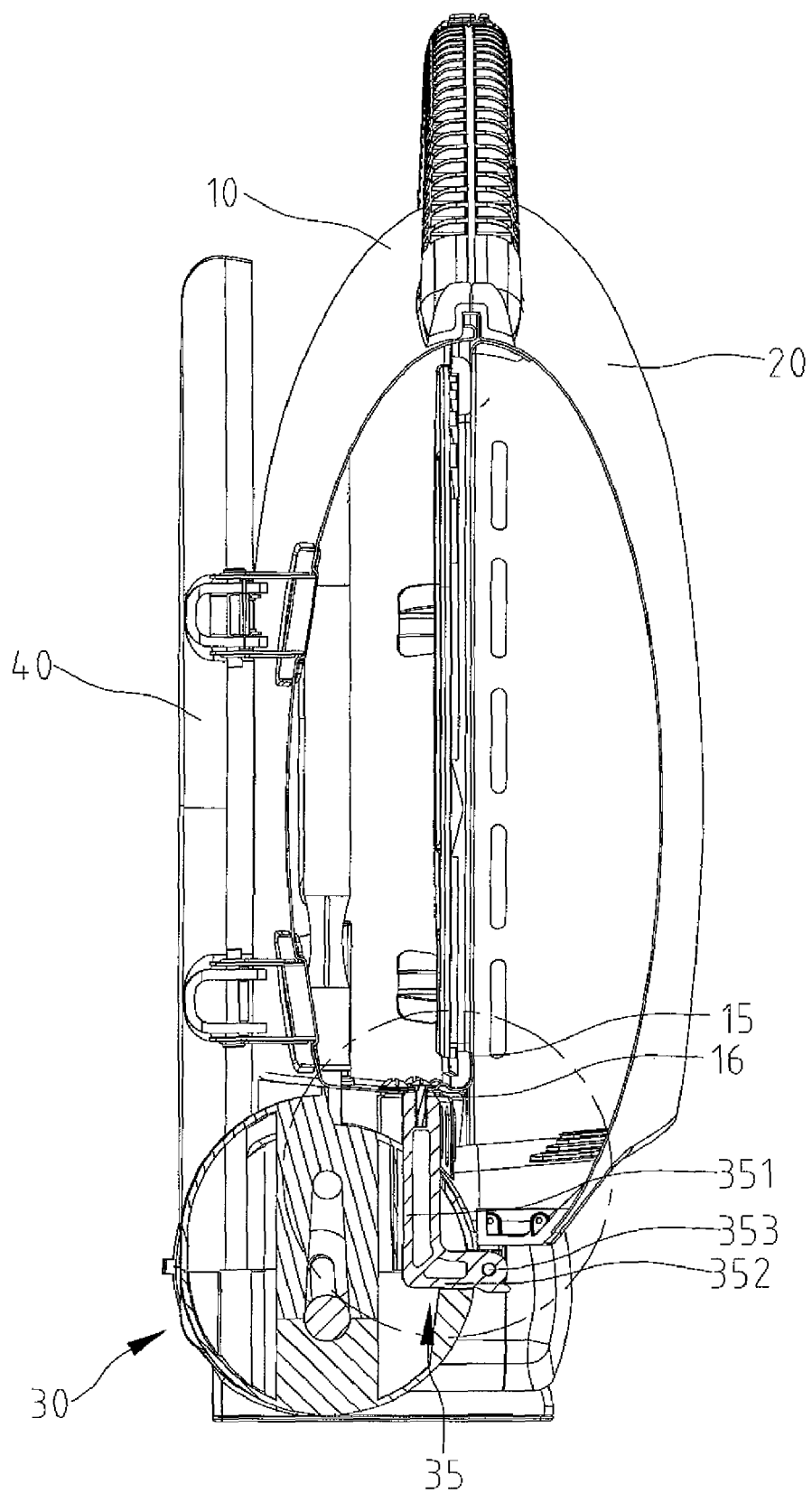
FIG. 5 is a cross-sectional view of the barbecue stove taken along line 5-5 shown in FIG. 4.
Figure 6:
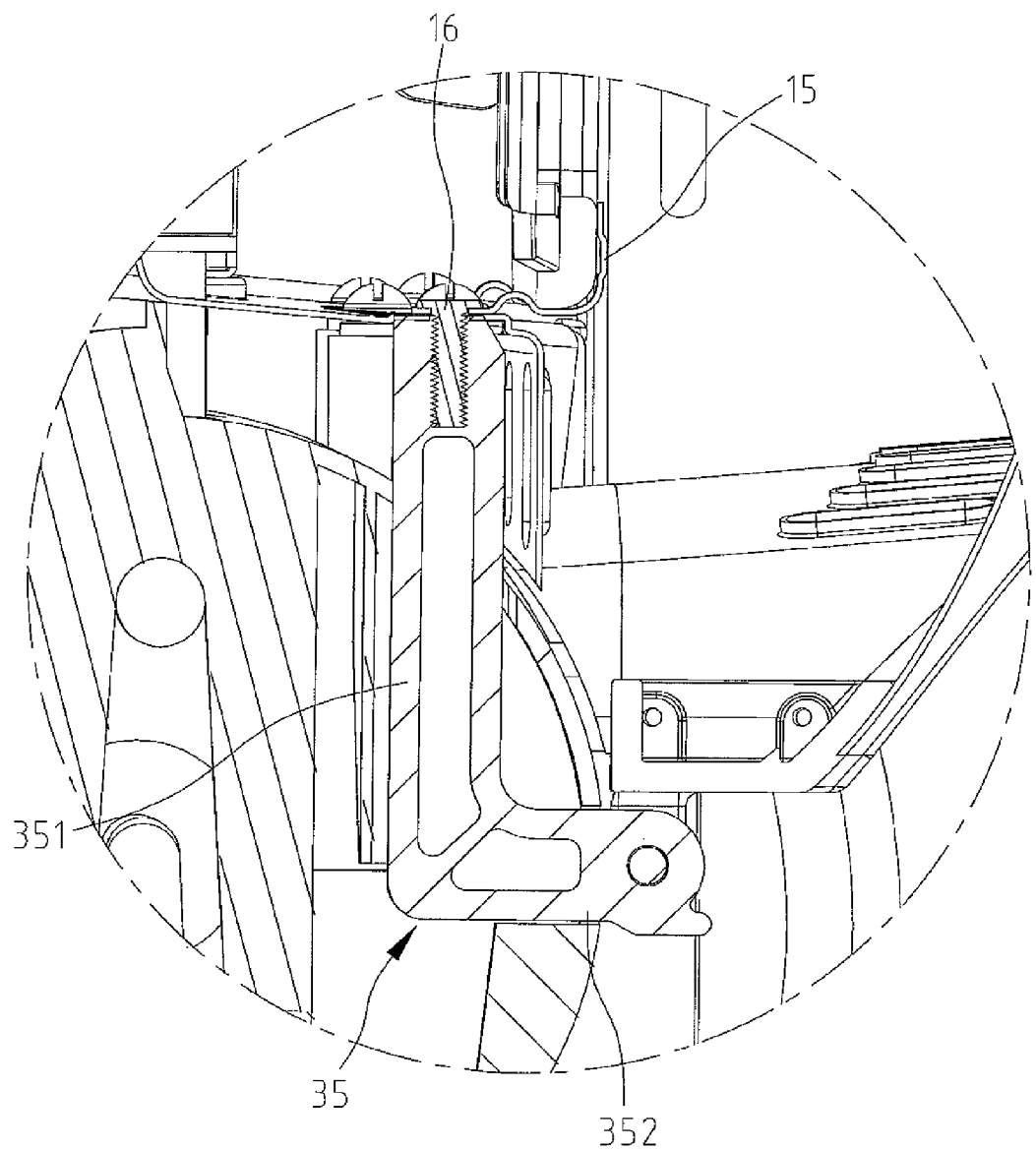
FIG. 6 is a partial, enlarged view of FIG. 5.

Referring to FIGS. 5 and 6, the cover 20 is pivotally connected to the body 10 with two hinges 35 about a pivot axis. The pivot axis is perpendicular to a pivot axis of either one of the primary feet 40.

Each of the hinges 35 is an L-shaped element including a first portion 351 and a second portion 352, and the first portion 351 is attached to the body 10 by threaded bolts 16. Additionally, the second portion 352 of each of the hinges 35 is used to connect to one ear 22. Because the first portion 351 of each hinge 35 has a length that is sufficiently long so the ear 22 connected to the second portion 352 is not adjacent to the heater 12. Therefore, the cover 20 is far from the heater 12 during the operation of the barbecue stove. In this regard, the cover 20 is not burning hot, and people will not be burnt by the cover 20.

Used together with each of the threaded bolts 16 is a tab 15. Each of the tabs 15 is an L-shaped element including a first portion and a second portion. Like a washer, the first portion of each of the tabs 15 is provided between the body 10 and an enlarged head of a related one of the threaded bolts 16. The second portion of each of the tabs 15 can be used to restrain the grid 14.

Figure 7:
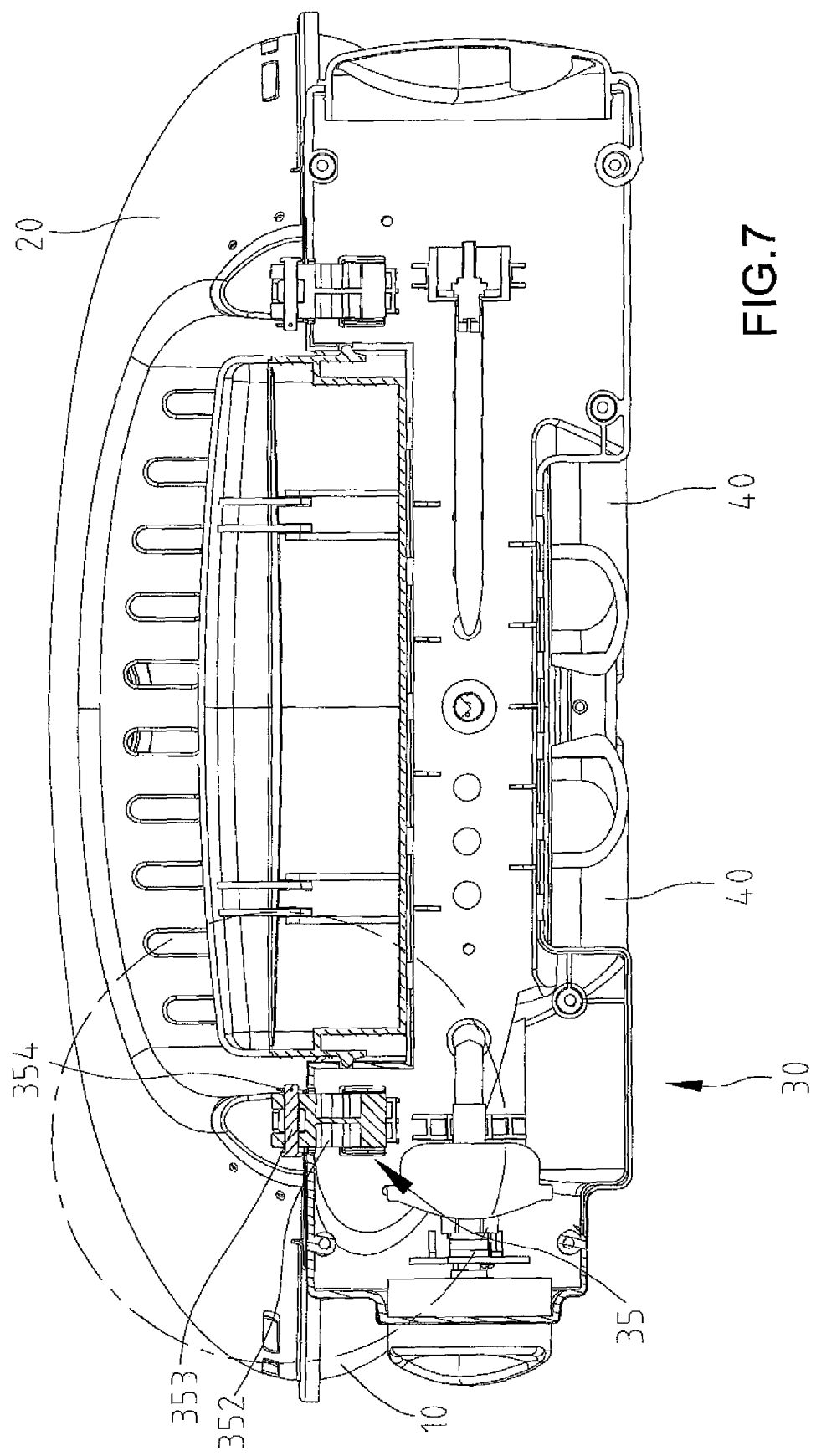
FIG. 7 is a cross-sectional view taken along line 7-7 shown in FIG. 4.
Figure 8:
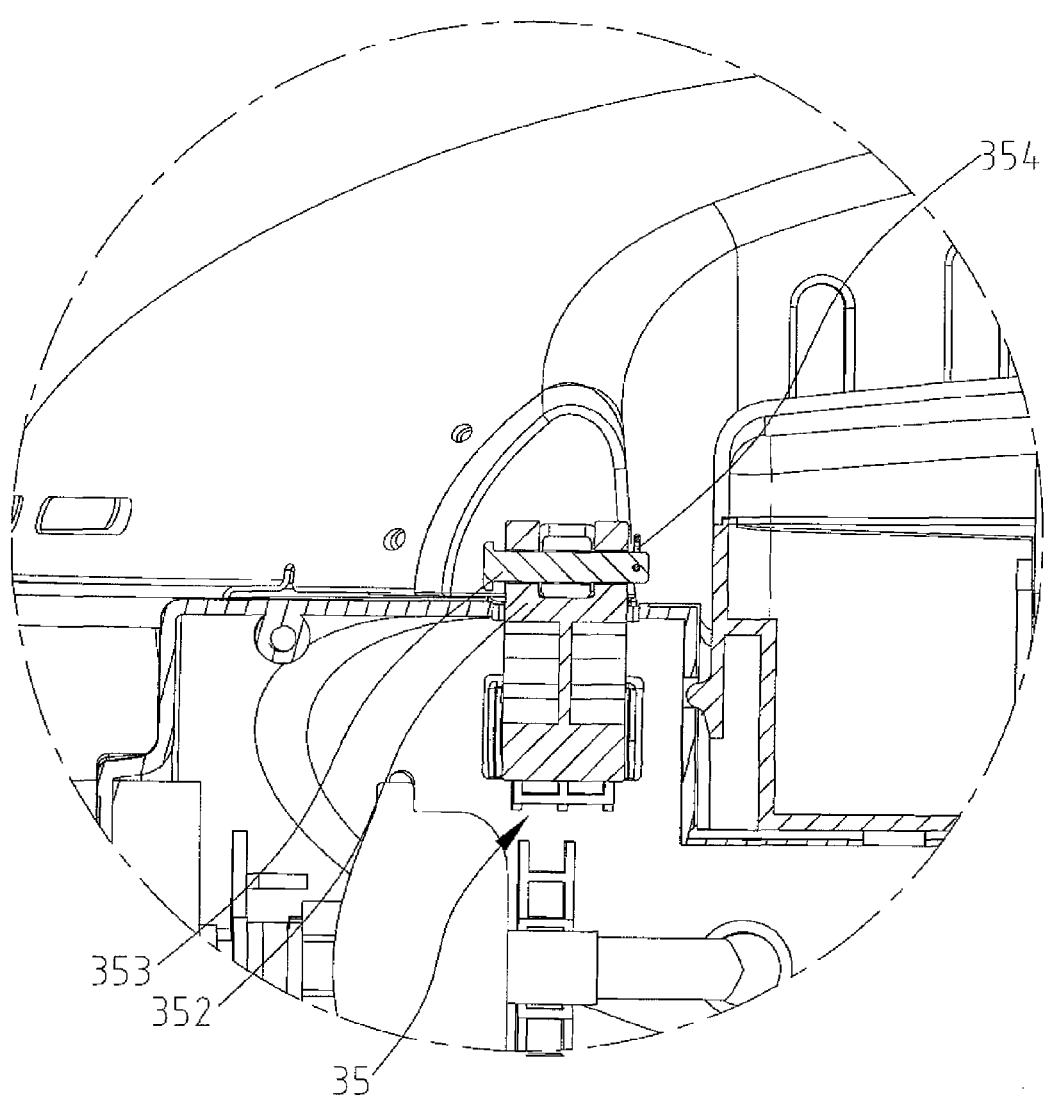
FIG. 8 is a partial, enlarged view of FIG. 7.

Referring to FIGS. 7 and 8, a pin 353 is driven into each of the ears 22 and the second portion 352 of a related one of the hinges 35 to pivotally connect the cover 20 to the hinges 35. A pin 354 is driven through each of the pins 353 to retain the pins 353 in the hinges 35. Additionally, one of the cutouts 313 of the first shell 31 and one of the cutout 323 of the second shell 32 corporate to form an aperture. Moreover, the second portion 352 of each hinge 35 is exposed from an aperture defined by the related cutouts 313 and 323.

The box 33 is formed with two hooks 331. The box 33 is disposed in the spaces 311 and 321. Additionally, one of the slots 311 and one of the spaces 321 cooperate to accommodate one of the hooks 331 to retain the box 33 in the spaces 311 and 321. Moreover, things such as an illuminating device may be stored in the box 33.

A pipe 34 is disposed in the cylinder defined by the first and second shells 31 and 32. The pipe 34 includes an end connected to the heater 12 and another end connected to a fuel can. Thus, fuel such as gas can be provided to the heater 12 from the fuel can through the pipe 34.

A button 38 is provided on the storage device 30. An igniter wire 39 is disposed in the cylinder. The igniter wire 39 includes an end connected to the button 38 and another end located near the heater 12. The igniter wire 39 is actuated to ignite the fuel from the heater 12 by pushing the button 38.

In addition, the body 10 includes a hole extending from the internal side to the external side. Further, a drip pan 50 is hung on the internal side of the body 10 and has a bottom with a dimension marginally smaller than that of the hole, such that the bottom of the drip pan 50 is exposed from the hole. Moreover, when the primary feet 40 are pivoted to the body 10, i.e. in a collapsed position, the primary feet 40 would not collide with the drip pan 50 disposed therebetween. In this embodiment, the hole and the bottom of the drip pan 50 are both of circular profile. Additionally, the primary feet 40 are arch-shaped.

As mentioned, the primary feet 40 are pivotally connected to the body 10. Specifically, the body 10 includes at least one mounting bracket 17 for connection with one primary foot 40. More specifically, the primary foot 40 includes at least one lug 41 adjoining with the at least one mounting bracket 17, thus connecting the primary foot 40 to the body 10. Preferably, each primary foot 40 includes two lugs 41, and the body 10 includes two mounting brackets 17 adjoining with the two lugs 41, respectively, enabling secure connection of the primary foot 40 to the body 10. Each lug 41 extends from an upper arcuate edge of the related primary foot 40 and includes two parallel sides in a spaced relationship, and a first hole 411 extending through the two parallel sides. Each mounting bracket 17 includes two parallel sides in a spaced relationship, and a hole 171 extending through the two parallel sides. Additionally, a fastener 42 is inserted through the hole 171 in the mounting bracket 17 and the first hole 411 in the related lug 41 to connect the primary foot 40 to the body 10. Further, the fastener 42 includes a shank 421 with a uniform cross-section, and an enlarged head 422 formed at a terminal end of the shank 421. The enlarged head 422 has a cross-section larger than that of the shank 421, and the hole 171 has a cross section smaller than that of the enlarged head 422. Thus, the enlarged head 422 can not be inserted through the hole 171. The fastener 42 further includes an aperture 423 extending through the shank 421 and transversely to a longitudinal length of the shank 421, and the aperture 422 is formed adjacent to another terminal end of the shank 421. When the fastener 42 is installed, the enlarged head 422 and aperture 423 are exposed outside a gap between the two parallel sides of the related mounting bracket 17. Additionally, the fastener 42 is prevented from disengagement from the mounting bracket 17 and the related lug 41 by inserting a retainer 43 through the aperture 423.

In addition, each primary foot 40 is pivotal with respect to the body 10 between the extended and collapsed positions in a way which prevents an accidental change therebetween. Accordingly, a positioning member 60 is installed between each lug 41 and the related mounting bracket 17. The positioning member 60 includes a resilient element 61 which is a substantially U-shaped wire, and the wire includes two distal ends spaced from one another and extended oppositely. Additionally, each end of the wire includes a retaining element 62 connected thereto. The retaining element 62 has a substantially hemispherical head portion. The lug 40 includes a second hole 412 extending through the two parallel sides. The mounting bracket 17 includes first and second retaining sections 172 and 173 formed thereon, and the first and second retaining sections 172 and 173 are radially spaced with the same predetermined distance with respect to the hole 171 or the shank 421 of the related fastener 42. Preferably, each of the first and second retaining sections 172 and 173 include two cavities inset oppositely on the two parallel sides, respectively. The resilient element 61 is installed between the parallel sides of the lug 41, and the two head portions extend through the two second holes 412, respectively, to selectively engage in one of the first and second retaining sections 172 and 173 for positioning the primary foot 40 in one of the collapsed and extended positions. Additionally, the retaining elements 62 of the positioning member 60 are adapted to move in an arcuate path between the first and second retaining sections 172 and 173 under pivoting of the primary foot 40 with respect to the body 10.

The barbecue stove according to the present invention exhibits several advantages. Firstly, it requires a small space in storage. Secondly, the storage device 30 can be used to store a fuel can and other things such as an illuminating device. Thirdly, it is quiet during transportation, since the grid does not rattle because of the brackets 13 and the tabs 15. Fourthly, the cover 20 is not burning hot since it is far from the heater as first portions 351 of the hinges 35 are long. Fifthly, each primary foot 40 is pivotal with respect to the body 10 between the extended and collapsed positions in a way which prevents an accidental change therebetween. Sixthly, the body 10 is spaced from the supporting surface at a height sufficient enough to enable heat to dissipate efficiently during the use of the barbecue stove.

Although specific embodiments have been illustrated and described, numerous modifications and variations are still possible without departing from the essence of the invention. The scope of the invention is limited by the accompanying claims.

What is claimed is:

1. A barbecue stove comprising:
a body;
a cover pivotally connected to the body;
a storage device including a first shell attached to the body and a second shell attached to the first shell, with the first shell including a first space, and with the second shell including a second space cooperating with the first space;
two primary feet disposed oppositely and pivotally attached to the body between a collapsed position adjacent to the body and an extended position extending from the body to space the body from a supporting surface against which the two primary feet abut, with the two primary feet in the extended position defining a use plane;
two secondary feet attached to the body and defining a storage plane for support on the supporting surface, with the use plane parallel to the supporting surface being perpendicular to the storage plane when the two primary feet are in the extended position and abut with the supporting position, with the body and the cover supported on the two primary feet in the extended position when in use, and with the body and the cover supported on the two secondary feet with the two primary feet in the collapsed position when in storage; and
two positioning members each engaged between the two primary feet and the body respectively;
wherein each positioning member includes an engaging end selectively moveable about a first pivot axis pivotally fixing a related primary foot to the body between first and second positions when the related primary foot is moved between the extended and collapsed positions, with the engaging end selectively engaged in first and second retaining sections of the body, with the first and second retaining sections radially distanced to the first pivot axis.

2. The barbecue stove according to claim 1 wherein the body includes two mounting brackets, wherein each primary foot includes a lug pivotally connected to the mounting bracket by a fastener, with the fastener serving as the first pivot axis, with each mounting bracket including the first and second retaining sections formed thereon, and with the first and second retaining sections radially spaced with the same predetermined distance with respect to the fastener.

3. The barbecue stove according to claim 1 further comprising at least one hinge pivotally connecting the cover and the body, and with the cover pivotable with respect to the body about a second pivot axis, and with the second pivot axis being perpendicular to the first pivot axis.

4. The barbecue stove according to claim 3 wherein the at least one hinge includes a first portion connected to the body and a second portion connected to the cover, and wherein the hinge is in the form of an L-shaped element, and with the first portion being longer than the second portion.

5. The barbecue stove according to claim 3 further comprising a threaded bolt connecting the first portion of the at least one hinge to the body.

6. The barbecue stove according to claim 5 further comprising a tab provided between an enlarged head of the threaded bolt and the body.

7. The barbecue stove according to claim 1 wherein at least one of the body and the cover comprises a handle formed thereon.

8. The barbecue stove according to claim 1 comprising a grid disposed in the body.

9. The barbecue stove according to claim 8 wherein the grid comprises two recesses for facilitating the handling thereof.

10. The barbecue stove according to claim 8 wherein the body comprises brackets formed thereon for supporting the grid.

11. The barbecue stove according to claim 1 wherein the storage device is adapted to store equipment and accessories.

12. The barbecue stove according to claim 3 wherein the first and second shells comprise at least one cutout for receiving the at least one hinge.

13. The barbecue stove according to claim 1 further comprising a heater disposed in the body.

14. The barbecue stove according to claim 1 wherein each of the first and second retaining sections of a related mounting bracket includes two cavities inset thereon oppositely.

15. A barbecue stove comprising:
a body;
a cover pivotally connected to the body;
a storage device including a first shell attached to the body and a second shell attached to the first shell, with the first shell including a first space, and with the second shell including a second space cooperating with the first space;
a box detachably disposed in the first and second spaces of the storage device;
two primary feet disposed oppositely and pivotally attached to the body between a collapsed position adjacent to the body and an extended position extending from the body to space the body from a supporting surface against which the two primary feet abut, with the two primary feet in the extended position defining a use plane;
two secondary feet attached to the body and defining a storage plane, with the use plane being perpendicular to the storage plane, with the body and the cover supported on the two primary feet in the extended position in use and supported on the two secondary feet and with the two primary feet in the collapsed position in storage; and
two positioning members each engaged between the two primary feet and the body respectively;
wherein each positioning member includes an engaging end selectively moveable about a first pivot axis of a related primary foot between first and second positions when the related primary foot is moved between the extended and collapsed positions;

wherein the body includes two mounting brackets, wherein each primary foot includes a lug pivotally connected to the mounting bracket by a fastener, with the fastener serving as the first pivot axis, wherein each mounting bracket includes first and second retaining sections formed thereon, with the first and second retaining sections radially spaced with the same predetermined distance with respect to the fastener, wherein each positioning member is selectively moveable between the first and second retaining sections of the related mounting bracket when the related primary foot is moved between the extended and collapsed positions; and wherein each positioning member includes a resilient element, which is a substantially U-shaped wire, including two distal ends spaced from each another and extending oppositely, and with the two distal ends serving as engaging ends thereof.

16. The barbecue stove according to claim 15 wherein the resilient element of each positioning member includes two retaining elements provided on the two distal ends thereof, and with each retaining element forming a hemispherical head selectively engagable between the first and second retaining sections of the related mounting bracket when the related primary foot is moved between the extended and collapsed positions.

17. The barbecue stove according to claim 15 further comprising a heater disposed in the body.

18. The barbecue stove according to claim 17 further comprising a button connected to an igniter wire and provided on the storage device, wherein the button is pushed to actuate the igniter wire.

19. A barbecue stove comprising:
a body;
a cover pivotally connected to the body;
a storage device including a first shell attached to the body and a second shell attached to the first shell, with the first shell including a first space, and with the second shell including a second space cooperating with the first space;
a box detachably disposed in the first and second spaces of the storage device;
two primary feet disposed oppositely and pivotally attached to the body between a collapsed position adjacent to the body and an extended position extending from the body to space the body from a supporting surface against which the two primary feet abut, with the two primary feet in the extended position defining a use plane;
two secondary feet attached to the body and defining a storage plane, with the use plane being perpendicular to the storage plane, with the body and the cover supported on the two primary feet in the extended position in use and supported on the two secondary feet and with the two primary feet in the collapsed position in storage; and
two positioning members each engaged between the two primary feet and the body respectively;
wherein each positioning member includes an engaging end selectively moveable about a first pivot axis of a related primary foot between first and second positions when the related primary foot is moved between the extended and collapsed positions;
wherein the box includes at least one hook formed thereon, and wherein the first and second shells include at least one slot cooperating for receiving the at least one hook.

* * * * *